United States Patent
Park

(10) Patent No.: US 11,332,131 B2
(45) Date of Patent: May 17, 2022

(54) DRIVER ASSISTANCE SYSTEM AND CONTROL METHOD THEREOF

(71) Applicant: MANDO CORPORATION, Pyeongtaek-si (KR)

(72) Inventor: JinHyeon Park, Osan-si (KR)

(73) Assignee: Mando Mobility Solutions Corporation, Pyeongtaek-si (KR)

(*) Notice: Subject to any disclaimer, the term of this patent is extended or adjusted under 35 U.S.C. 154(b) by 113 days.

(21) Appl. No.: 16/891,766

(22) Filed: Jun. 3, 2020

(65) Prior Publication Data

US 2020/0384988 A1 Dec. 10, 2020

(30) Foreign Application Priority Data

Jun. 4, 2019 (KR) .................. 10-2019-0065967

(51) Int. Cl.
*B60W 30/095* (2012.01)
*G01S 13/931* (2020.01)
*G01S 13/86* (2006.01)

(52) U.S. Cl.
CPC .... *B60W 30/0953* (2013.01); *B60W 30/0956* (2013.01); *G01S 13/867* (2013.01); *G01S 13/931* (2013.01); *B60W 2420/42* (2013.01); *B60W 2420/52* (2013.01); *B60W 2510/20* (2013.01)

(58) Field of Classification Search
CPC ......... B60W 2420/42; B60W 2420/52; B60W 2510/20; B60W 30/0953; B60W 30/0956; G01S 13/867; G01S 13/87; G01S 13/931; G01S 2013/9318; G01S 2013/93185; G01S 2013/93271
See application file for complete search history.

(56) References Cited

U.S. PATENT DOCUMENTS

| | | | | |
|---|---|---|---|---|
| 9,336,436 B1* | 5/2016 | Dowdall | ............ | G06K 9/00362 |
| 9,501,935 B2* | 11/2016 | Kastner | ................. | B60W 30/09 |
| 9,505,412 B2* | 11/2016 | Bai | ......................... | B60K 37/06 |
| 9,731,717 B2* | 8/2017 | Kim | ....................... | G01S 13/865 |
| 9,802,614 B1* | 10/2017 | Yoon | ................. | B60W 30/0956 |
| 10,281,920 B2* | 5/2019 | Frazzoli | ............... | G05D 1/0219 |
| 10,328,935 B2* | 6/2019 | O'Dea | ................... | B60W 30/16 |

(Continued)

FOREIGN PATENT DOCUMENTS

| | | | | |
|---|---|---|---|---|
| EP | 3360747 A1 * | 8/2018 | ............ | B60W 40/04 |
| EP | 3330943 B1 * | 10/2019 | ........ | B60W 30/0956 |

*Primary Examiner* — Babar Sarwar
(74) *Attorney, Agent, or Firm* — Morgan, Lewis & Bockius LLP

(57) ABSTRACT

Disclosed herein is a driver assistance system and a control method thereof. The driver assistance system includes a radar installed in a vehicle to detect other vehicle driving outside of the vehicle, and configured to acquire radar data comprising position information of the other vehicle, and a controller configured to calculate a risk of collision based on a relative distance of the other vehicle with respect to the vehicle. The controller generates a first region of interest partitioned along an expected driving path of the vehicle, generates a second region of interest during the vehicle moves along the expected driving path of the vehicle, when other vehicle is detected in the first region of interest, and calculates a relative distance of the other vehicle detected in the second region of interest.

12 Claims, 6 Drawing Sheets

(56) References Cited

U.S. PATENT DOCUMENTS

| | | | |
|---|---|---|---|
| 10,818,177 B2* | 10/2020 | Sakaguchi | G08G 1/167 |
| 11,011,059 B2* | 5/2021 | Suzuki | B60W 30/12 |
| 2009/0303026 A1* | 12/2009 | Broggi | G01S 17/86 |
| | | | 340/435 |
| 2010/0211235 A1* | 8/2010 | Taguchi | B60T 8/1755 |
| | | | 701/1 |
| 2011/0246156 A1* | 10/2011 | Zecha | G06K 9/00342 |
| | | | 703/6 |
| 2014/0074356 A1* | 3/2014 | Bone | G08G 1/167 |
| | | | 701/41 |
| 2014/0324330 A1* | 10/2014 | Minemura | G08G 1/16 |
| | | | 701/301 |
| 2015/0046078 A1* | 2/2015 | Biess | G08G 1/163 |
| | | | 701/301 |
| 2015/0206001 A1* | 7/2015 | Maurer | G06K 9/00805 |
| | | | 382/103 |
| 2016/0114798 A1* | 4/2016 | Kim | B60W 30/095 |
| | | | 701/41 |
| 2017/0210382 A1* | 7/2017 | Nishimura | B60W 30/09 |
| 2018/0162394 A1* | 6/2018 | Kamiya | G06K 9/00805 |
| 2018/0218227 A1* | 8/2018 | Takaki | G06K 9/3241 |
| 2019/0126893 A1* | 5/2019 | Kim | G01S 7/412 |
| 2019/0369626 A1* | 12/2019 | Lui | G06F 30/20 |
| 2019/0377354 A1* | 12/2019 | Shalev-Shwartz | G05D 1/0231 |
| 2020/0062251 A1* | 2/2020 | Park | B60W 30/0956 |
| 2020/0201349 A1* | 6/2020 | Ha | G08G 1/163 |
| 2020/0242941 A1* | 7/2020 | Kim | B62D 15/0295 |
| 2021/0316721 A1* | 10/2021 | Lim | G06K 9/00798 |

* cited by examiner

DRIVER ASSISTANCE SYSTEM AND CONTROL METHOD THEREOF

CROSS-REFERENCE TO RELATED APPLICATION(S)

This application is based on and claims priority under 35 U.S.C. § 119 to Korean Patent Application No. 10-2019-0065967, filed on Jun. 4, 2019, in the Korean Intellectual Property Office, the disclosure of which is incorporated by reference herein in its entirety.

BACKGROUND

1. Field

Embodiments of the present disclosure relate to a driver assistance system, more particularly to a driver assistance system capable of avoiding a collision with an external vehicle approaching from the front of a vehicle.

2. Description of Related Art

In general, Driver Assistance System (DAS) has a function of avoiding a collision with other vehicle that is driving on the same lane, and a function of avoiding a collision with a vulnerable user (VRU) in front of the vehicle.

However, the above-described case corresponds to a case of detecting an obstacle around the vehicle without considering an expected driving path of the vehicle. In reality, when a vehicle drives along a curved path, rather than a straight path, there are various anomalous factors in estimating the risk of the collision.

SUMMARY

Therefore, it is an aspect of the present disclosure to provide a driver assistance system capable of precisely estimating a risk of collision with other vehicle by generating a region of interest to which an expected driving path of a vehicle is applied, and a control method thereof.

Additional aspects of the present disclosure will be set forth in part in the description which follows and, in part, will be obvious from the description, or may be learned by practice of the present disclosure.

In accordance with an aspect of the disclosure, a driver assistance system includes a radar installed in a vehicle to detect other vehicle driving outside of the vehicle, and configured to acquire radar data comprising position information of the other vehicle, and a controller configured to calculate a risk of collision based on a relative distance of the other vehicle with respect to the vehicle. The controller generates a first region of interest partitioned along an expected driving path of the vehicle, generates a second region of interest during the vehicle moves along the expected driving path of the vehicle, when other vehicle is detected in the first region of interest, and calculates a relative distance of the other vehicle detected in the second region of interest.

The first region of interest may be partitioned along the expected driving path according to a steering angle of the vehicle, and a shape of the first region of interest may have a curved triangle.

The first region of interest may be generated with respect to a first coordinate system, and the second region of interest may be generated with respect to a second coordinate system corresponding to after the vehicle moves along the expected driving path for a pre-selected period of time. The second coordinate system may correspond to a coordinate system in which movement transformation and rotational transformation is performed on the origin of the first coordinate system.

The second region of interest may be partitioned along the expected driving path according to a steering angle of the vehicle, and a shape of the second region of interest may have a curved triangle.

The controller may calculate a position vector of the other vehicle when the other vehicle is detected in the second region of interest and when a value of position vector is reduced, the controller may increase a risk of collision.

The driver assistance system may further include a camera installed in the vehicle to have a field of view outward of the vehicle, and configured to acquire position information of the other vehicle.

In accordance with an aspect of the disclosure, a control method of a driver assistance system includes acquiring radar data comprising position information of other vehicle, and calculating a risk of collision based on a relative distance of the other vehicle with respect to the vehicle. The calculation of the risk of collision includes generating a first region of interest partitioned along an expected driving path of the vehicle, generating a second region of interest after the vehicle moves along the expected driving path of the vehicle, when other vehicle is detected in the first region of interest, and calculating a relative distance of the other vehicle detected in the second region of interest.

The first region of interest may be partitioned along the expected driving path according to a steering angle of the vehicle, and a shape of the first region of interest may have a curved triangle.

The first region of interest may be generated with respect to a first coordinate system, and the second region of interest may be generated with respect to a second coordinate system corresponding to after the vehicle moves along the expected driving path for a pre-selected period of time. The second coordinate system may correspond to a coordinate system in which movement transformation and rotational transformation is performed on the origin of the first coordinate system.

The second region of interest may be partitioned along the expected driving path according to a steering angle of the vehicle, and a shape of the second region of interest may have a curved triangle.

The calculation of the risk of collision may include calculating a position vector of the other vehicle when the other vehicle is detected in the second region of interest and increasing a risk of collision when a value of position vector is reduced.

The control method may further include acquiring position information of the other vehicle based on image data acquired by a camera installed in the vehicle.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
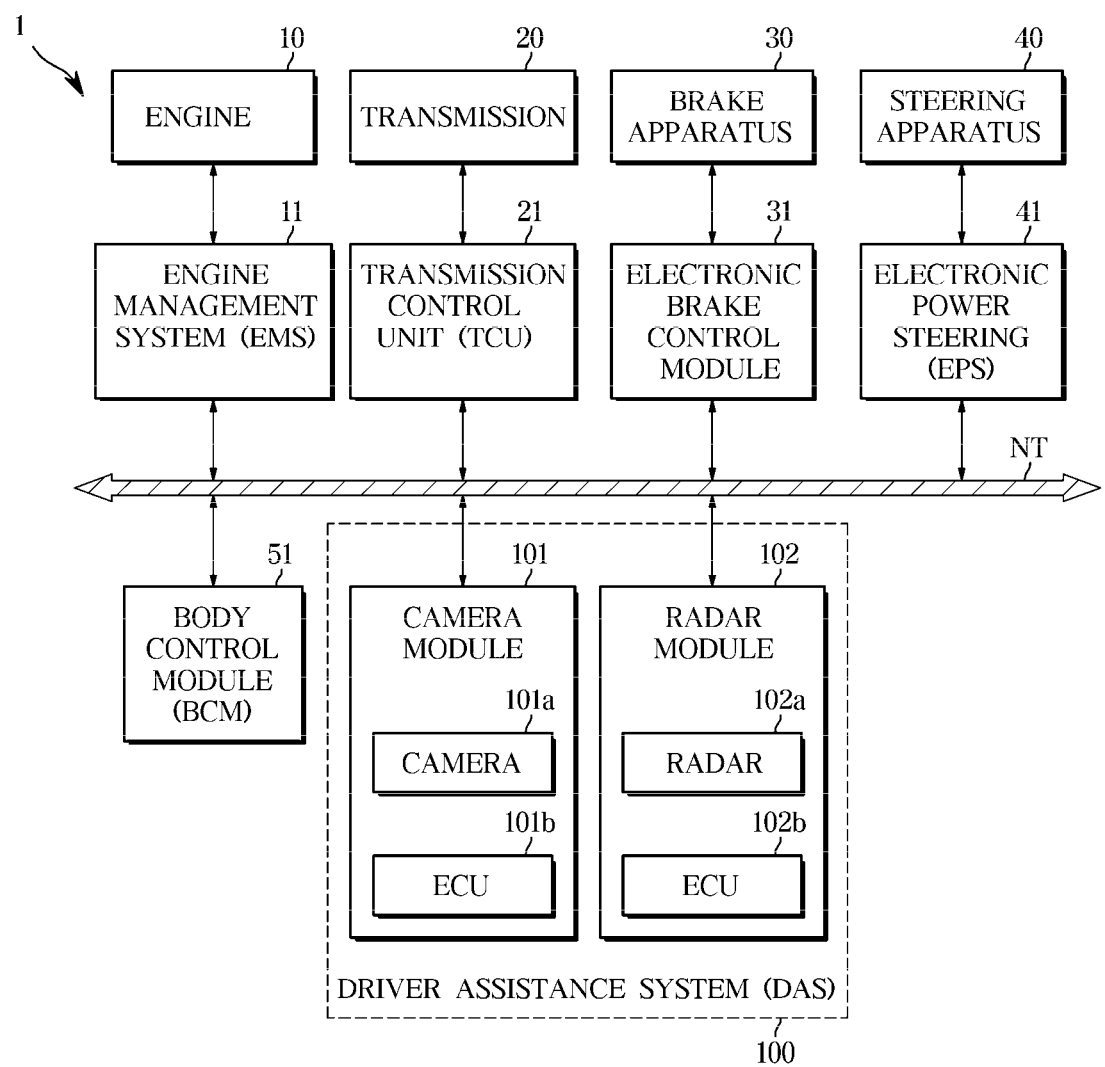
FIG. 1 is a diagram illustrating a configuration of a vehicle according to an embodiment.

In the following description, like reference numerals refer to like elements throughout the specification. Well-known functions or constructions are not described in detail since they would obscure the one or more exemplar embodiments with unnecessary detail. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

Throughout the description, when a member is "on" another member, this includes not only when the member is in contact with the other member, but also when there is another member between the two members.

It will be understood that, although the terms first, second, third, etc., may be used herein to describe various elements, but is should not be limited by these terms. These terms are only used to distinguish one element from another element.

As used herein, the singular forms "a," "an" and "the" are intended to include the plural forms as well, unless the context dearly indicates otherwise.

An identification code is used for the convenience of the description but is not intended to illustrate the order of each step. The each step may be implemented in the order different from the illustrated order unless the context clearly indicates otherwise.

Reference will now be made in detail to embodiments of the present disclosure, examples of which are illustrated in the accompanying drawings.

FIG. 1 is a diagram illustrating a configuration of a vehicle according to an embodiment.

As illustrated in FIG. 1, a vehicle 1 may include an engine 10, a transmission 20, a brake apparatus 30, and a steering apparatus 40. The engine 10 may include a cylinder and a piston, and generate a power to drive the vehicle 1. The transmission 20 may include a plurality of gears and transmit the power generated by the engine 10 to vehicle wheels. The brake apparatus 30 may decelerate the vehicle 1 or stop the vehicle 1 through the friction with the vehicle wheel. The steering apparatus 40 may change a driving direction of the vehicle 1.

The vehicle 1 may include a plurality of automotive electronics. For example, the vehicle 1 may further include an engine management system (EMS) 11, a transmission control unit (TCU) 21, an electronic brake control module 31, an electronic power steering (EPS) 41 and a body control module (BCM) and a driver assistance system (DAS).

The EMS 11 may control the engine 10 in response to a drivers acceleration intention through an acceleration pedal, or in response to a request of the DAS 100. For example, the EMS 11 may control a torque of the engine 10.

The TCU 21 may control the transmission 20 in response to a drivers shift command through a shift lever and/or in response to a driving speed of the vehicle 1. For example, the TCU 21 may regulate a shift ratio from the engine 10 to the vehicle wheels.

The electronic brake control module 31 may control the brake apparatus 30 in response to a drivers brake intention through a brake pedal and/or a slip of the vehicle wheels. For example, the electronic brake control module 31 may temporarily release the brake of the vehicle wheels in response to the slip of the vehicle wheels that is detected at the time of braking of the vehicle 1 (Anti-lock Braking Systems; ABS). The electronic brake control module 31 may selectively release the brake of the vehicle wheels in response to over-steering and/or under-steering that is detected at the time of steering of the vehicle 1 (Electronic stability control; ESC). In addition, the electronic brake control module 31 may temporarily stop the vehicle wheels in response to the slip of the vehicle wheels that is detected at the time of driving of the vehicle 1 (Traction Control System; TCS).

In response to a drivers steering intention through the steering wheel, the EPS 41 may assist an operation of the steering apparatus 40 to allow a driver to easily operate a steering wheel. For example, the EPS 41 may assist the operation of the steering system 40 so as to reduce the steering force during low-speed driving, or parking and to increase the steering force during high-speed driving.

The BCM 51 may control an operation of the automotive electronics configured to provide the convenience to a driver or configured to secure the safety of the driver. For example, the BCM 51 may control a head lamp, a wiper, a cluster, a multifunction switch and a direction indicator lamp.

The DAS 100 may assist a driver to operate (driving, braking and steering) the vehicle 1. For example, the DAS 100 may identify the surrounding environment of the vehicle 1 (e.g., other vehicle, a pedestrian, a cyclist, a lane, and a road sign) and control driving, braking and/or steering of the vehicle 1 based on the identified surrounding environment.

The DAS 100 may provide a variety of functions to a driver. For example, the DAS 100 may provide Lane Departure Warning (LDW), Lane Keeping Assist (LKA), High Beam Assist (HBA), Autonomous Emergency Braking (AEB), Traffic Sign Recognition (TSR), Smart Cruise Control (SCC), and Blind Spot Detection (BSD).

The DAS 100 may include a camera module 101 acquiring image data around the vehicle 1, and a radar module 102 acquiring object data of the surroundings of the vehicle 1.

The camera module 101 may include a camera 101a and an electronic control unit (ECU) 101b. The camera module 101 may acquire an image of the front of the vehicle 1 and identify other vehicle, a pedestrian, a cyclist, a lane, and a road sign.

The radar module 102 may include a radar 102a and a controller 102b. The radar module 102 may acquire a relative distance and a relative speed of an object (e.g., other vehicle, a pedestrian, a cyclist, a lane, and a road sign) in the surroundings.

The above mentioned automotive electronics may communicate with each other through the vehicle communication network (NT). For example, automotive electronics may transmit and receive data through Ethernet, Media Oriented Systems Transport (MOST), FlexRay, Controller Area Network (CAN), and Local Interconnect Network (LIN). For example, the DAS 100 may transmit a drive control signal, a braking signal and a steering signal to the EMS 11, the electronic brake control module 31, and the EPS 41 through the vehicle communication network (NT).

Figure 2:
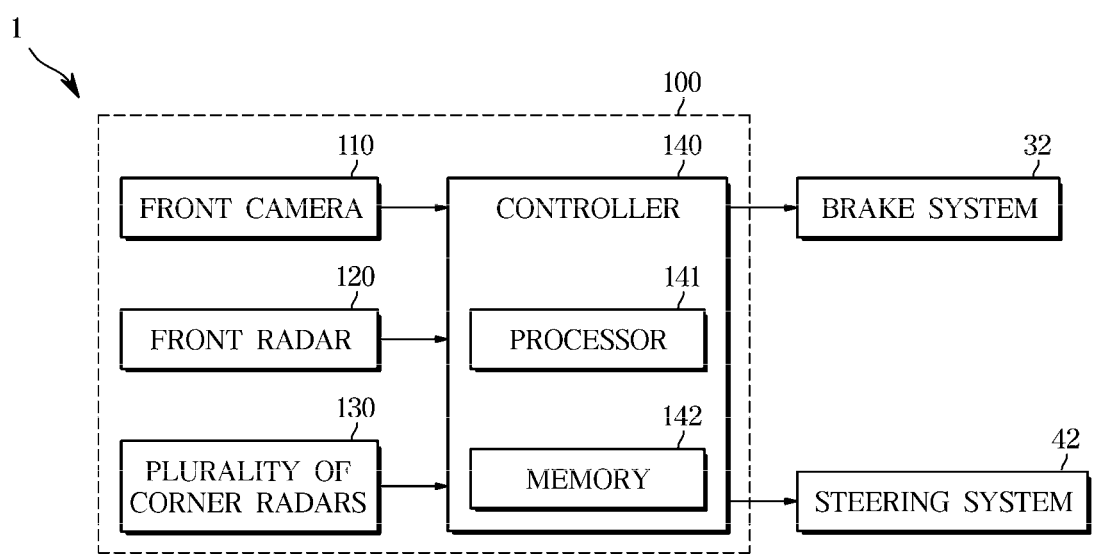
FIG. 2 is a diagram illustrating a configuration of a driver assistance system according to an embodiment.
Figure 3:
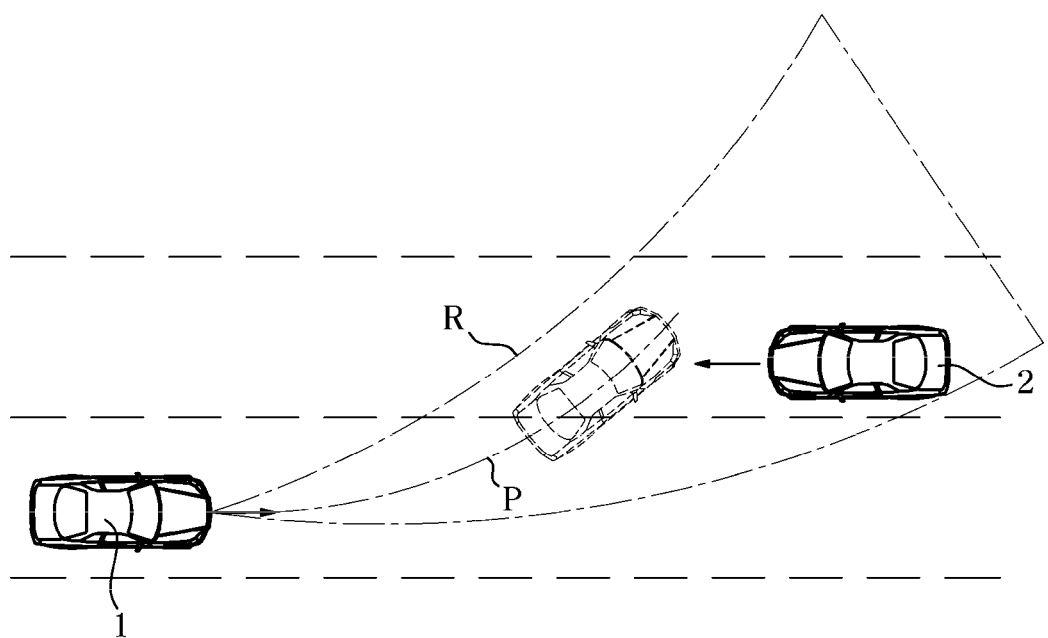
FIG. 3 is a view illustrating a region of interest.

FIG. 2 is a diagram illustrating a configuration of a driver assistance system according to an embodiment. FIG. 3 is a view illustrating a camera and a radar contained in the driver assistance system according to an embodiment.

As illustrated in FIG. 2, the vehicle 1 may include a brake system 32, a steering system 42 and the DAS 100.

The brake system 32 may include the electronic brake control module 31 (refer to FIG. 1) and the brake apparatus 30 (refer to FIG. 1) described with reference to FIG. 1. The steering system 42 may include the EPS 41 (refer to FIG. 1) and the steering apparatus 40 (refer to FIG. 1) described with reference to FIG. 1.

The DAS 100 may include a front camera 110, a front radar 120 and a plurality of corner radars 130.

As illustrated in FIG. 3, the front camera 110 may have a field of view 110a toward the front of the vehicle 1. For example, the front camera 110 may be installed on a front window shield of the vehicle 1.

The front camera 110 may record the front of the vehicle 1 and acquire front image data of the vehicle 1. The front image data of the vehicle 1 may include information on other vehicle, a pedestrian, a cyclist, and a lane in front of the vehicle 1.

The front camera 110 may include a plurality of lenses and an image sensor. The image sensor may include a plurality of photodiodes that convert light into electrical signals. The plurality of photodiodes may be arranged in a two-dimensional matrix.

The front camera 110 may be electrically connected to a controller 140. For example, the front camera 110 may be connected to the controller 140 through the vehicle communication network (NT), a hard wire or a printed circuit board (PCB).

The front camera 110 may transmit the front image data of the vehicle 1 to the controller 140.

As illustrated in FIG. 3, the front radar 120 may have a field of sensing 120a toward the front of the vehicle 1. For example, the front radar 120 may be installed in a grille or a bumper of the vehicle 1.

The front radar 120 may include a transmission antenna (i.e., transmission antenna array) radiating a transmission radio wave toward the front of the vehicle 1, and a reception antenna (i.e., reception antenna array) receiving a reflected radio wave reflected from an object. The front radar 120 may acquire front radar data from the transmission radio wave that is transmitted by the transmission antenna and the reflected radio wave received by the reception antenna. The front radar data may include distance information and speed information on other vehicle, a pedestrian, a cyclist, and a lane in front of the vehicle 1. The front radar 120 may calculate a state distance to an object based on a phase difference (or time difference) between the transmission radio wave and the reflected radio wave, and calculate a relative speed of an object based on a frequency difference between the transmission radio wave and the reflected radio wave.

The front radar 120 may be connected to the controller 140 through the vehicle communication network (NT), a hard wire or a printed circuit board (PCB). The front radar 120 may transmit the front radar data to the controller 140.

The plurality of corner radars 130 may include a first corner radar 131 installed on the front right side of the vehicle 1, a second corner radar 132 installed on the front left side of the vehicle 1, a third corner radar 133 installed on the rear right side of the vehicle 1, and a fourth corner radar 134 installed on the rear left side of the vehicle 1.

The controller 140 may include a controller 101b (refer to FIG. 1) of the camera module 101 (refer to FIG. 1) and/or a controller 102b (refer to FIG. 1) of the radar module (refer to FIG. 1) and/or a separate integrated controller. The controller 140 may include a processor 141 and a memory 142.

According to an embodiment, the controller 140 may acquire position information of other vehicle based on the radar data acquired by the radar provided in the vehicle 1. The position information may be indicated by a coordinate value that is with respect to a particular coordinate system or with respect to the vehicle 1. The relative distance and relative speed between the vehicle 1 and the other vehicle may be calculated based on the coordinate values. A particular calculation process will be described in detail with reference to FIGS. 4 and 5. The controller 140 may calculate a risk of collision based on the relative distance and the relative speed. For example, when a relative distance between the vehicle 1 and other vehicle is smaller than a preselected distance, the risk of collision may be estimated at a high value by the controller 140. The risk of collision may represent a measure of the possibility of the collision between the vehicle 1 and other vehicle. The controller may generate a signal informing a driver of a collision warning when the risk of collision is equal to or greater than a preselected value.

Meanwhile, in order to precisely calculate the risk of collision, the controller 140 may generate a first region of interest that is partitioned along an expected driving path of the vehicle 1. The controller 140 may generate a second region of interest when detecting other vehicle in the first region of interest. The second region of interest may represent a new region of interest generated after the vehicle 1 drives along the expected driving path a particular distance. The controller 140 may measure a relative distance to other vehicle only when detecting the other vehicle in the second region of interest, and calculate the risk of collision based on the relative distance.

The processor 141 may process the front image data of the front camera 110, the front radar data of the front radar 120, and the corner radar data of the plurality of radars 130, and generate the braking signal and the steering signal for controlling the brake system 32 and the steering system 42. For example, the processor 141 may include an image signal processor processing the front image data of the front camera 110 and/or a digital signal processor processing the radar data of the radars 120 and 130, and/or a micro control unit (MCU) generating the braking signal and the steering signal.

The processor 141 may identify objects in front of the vehicle 1 (e.g., other vehicle, a pedestrian, and a cyclist) based on the front image data of the front camera 110 and the front radar data of the front radar 120.

Particularly, the processor 141 may acquire position information (distance and direction) and speed information (relative speed) of the objects in front of the vehicle 1 based on the front radar data of the front radar 120. The processor 141 may acquire position information (direction) and type information of the objects (e.g., whether an object is other vehicle or a pedestrian, or a cyclist) in front of the vehicle 1 based on the front image data of the front camera 110. In addition, the processor 141 may match the objects identified based on the front image data, with the objects identified based on the front radar data, and acquire the type information, the position information and the speed information of the objects in front of the vehicle 1, based on the matching result.

The processor 141 may generate the braking signal and the steering signal based on the type information, the position information, and the speed information of the front objects.

For example, the processor 141 may calculate a time to collision (TTC) between the vehicle 1 and the object in front of the vehicle 1, based on the position information (direction) and the speed information (relative speed) of the front objects, and warn the collision to a driver or transmit a braking signal to the brake system 32, based on the result of comparison between the TTC and the preselected reference time. The processor 141 may output a warning through an audio system and/or a display in response to a TTC that is less than a preselected first reference time. The processor 141 may transmit a pre-braking signal to the brake system 32 in response to a TTC that is less than a preselected second reference time. The processor 141 may transmit an emergency braking signal to the brake system 32 in response to a TTC that is less than a preselected third reference time. The second reference time is less than the first reference time and the third reference time is less than the second reference time.

As another example, the processor 141 may calculate a distance to collision (DTC) based on the speed information (relative velocity) of the front objects, and warn the collision to a driver or transmit a braking signal to the brake system 32, based on the result of comparison between the DTC and the distance to the front objects.

The processor 141 may acquire position information (distance and direction) and speed information (relative speed) of the objects in the lateral side of the vehicle 1 (front right side, front left side, rear right side, and rear left side) based on the corner radar data of the plurality of corner radars 130.

The memory 142 may store a program and/or data for processing the image data by the processor 141, a program and/or data for processing the radar data by the processor 141, and a program and/or data for generating the braking signal and/or the steering signal by the processor 141.

The memory 142 may temporarily store the image data received from the front camera 110 and/or the radar data received from the radars 120 and 130, and temporarily store a processing result of the image data and/or the radar data of the processor 141.

The memory 142 may include a volatile memory such as S-RAM and D-RAM, and a non-volatile memory such as flash memory, Read Only Memory (ROM) and Erasable Programmable Read Only Memory (EPROM).

Hereinbefore the configuration of the DAS 100 has been described. Hereinafter setting a region of interest and calculating a risk of collision related to the process performed by the DAS 100 will be described in details.

Referring to FIG. 3, in order to calculate a risk of collision with other vehicle 2, the controller 140 may generate a region of interest (R) based on an expected driving path (P). The controller 140 may perform a computation to calculate the risk of collision with other vehicle upon detecting the other vehicle in the region of interest (R). The expected driving path (P) may be selected by a steering angle received through the steering apparatus of the vehicle 1. Therefore, a driving radius of the expected driving path (P) may be selected by the received steering angle.

The region of interest (R) may be generated as a region partitioned along the expected driving path (P). For example, as illustrated in FIG. 3, the region of interest (R) may be selected as a curved triangle by two curves, which are adjacent to the curved expected driving path (P), and a single straight line connecting the two curves. However, the shape of the region of interest (R) is not limited thereto. According to the setting, the shape of the region of interest (R) may employ various shapes such as a curved fan shape and a curved rectangle. Accordingly, the controller 140 may perform the computation about a region where there is the risk of collision of the vehicle 1, and thus it may be possible to reduce an amount of computation processing performed by the controller.

According to an embodiment, the first region of interest may be partitioned along the expected driving path (P) based on the steering angle of the vehicle 1, and thus the shape of the first region of interest may have a curved triangle. In the same manner, the second region of interest may be partitioned along the expected driving path (P) based on the steering angle of the vehicle 1, and thus the shape of the second region of interest may have a curved triangle.

Meanwhile, the region of interest (R) may include the first region of interest and the second region of interest. The second region of interest may represent a region of interest after the point of time when the first region of interest is generated. Particularly, the second region of interest may correspond to a region of interest generated in other position after the vehicle 1 moves along the expected driving path (P) after the first region of interest is generated. The first region of interest and the second region of interest may be generated discontinuously or continuously at a pre-selected time interval.

The first region of interest and the second region of interest may be partitioned with respect to the coordinate system. To calculate the risk of collision, the controller 140 may use a first coordinate system and a second coordinate system. A detail description of the first coordinate system and the second coordinate system will be described with reference to FIGS. 4 and 5.

Figure 4:
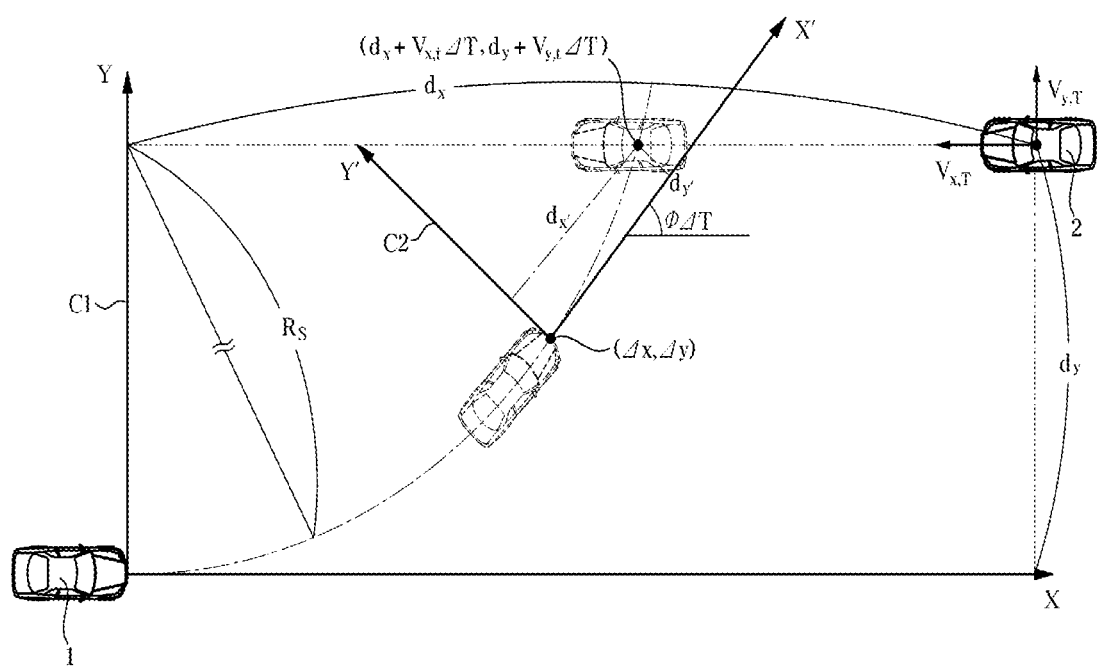
FIGS. 4 and 5 are views illustrating an example of calculating a risk of collision.

As illustrated in FIG. 4, the coordinate system for calculating the risk of collision may include the first coordinate system (C1) and the second coordinate system (C2). X-axis may represent a direction parallel to the driving direction of the vehicle 1 and Y-axis may represent a direction perpendicular to the driving direction of the vehicle 1. However, the criterion is arbitrary and thus it should be understood that various criteria can be applied according to the setting.

The first coordinate system (C1) may correspond to a coordinate system to measure a relative distance of the other vehicle 2 before the vehicle 1 moves along the expected driving path. Referring to FIG. 4, dx may represent a relative distance of the other vehicle 2 in X-axis with respect to the vehicle 1, and dy may represent a relative distance of the other vehicle 2 in Y-axis with respect to the vehicle 1. As illustrated in FIG. 4, Rs may represent a turning radius of the expected driving path of the vehicle 1, and a value of Rs may be acquired based on the steering angle of the vehicle. φ may represent an angular speed of the vehicle.

In addition, Δx and Δy may represent a position of X-axis and a position of Y-axis after the vehicle 1 moves, respectively. Vx, 1 may be a X-axis speed of the vehicle 1, and Vy, 1 may be a Y-axis speed of the vehicle 1. Vx, 2 may be a X-axis speed of the other vehicle 2, and Vy, 2 may be a Y-axis speed of the other vehicle 2.

The second coordinate system (C2) may correspond to a coordinate system to measure a relative distance of the other vehicle 2 after the vehicle 1 moves along the expected driving path. Referring to FIG. 4, dx' may represent a relative distance of the other vehicle 2 in X'-axis with respect to the vehicle 1, and dy' may represent a relative distance of the other vehicle 2 in Y'-axis with respect to the vehicle 1.

The second coordinate system (C2) may represent a coordinate system to which a reference frame, which is changed according to the movement of the vehicle 1, is applied. For example, a coordinate value measured by the second coordinate system (C2) may be a value acquired by performing at least one of movement transformation and rotational transformation on a coordinate value measured by the first coordinate system (C1).

Figure 5:
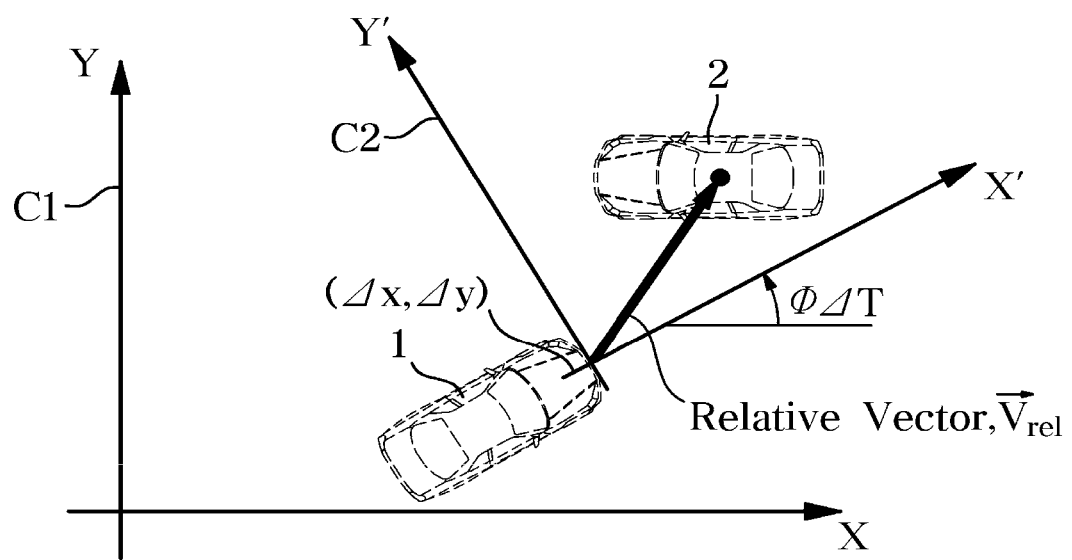

Referring to FIGS. 4 and 5, a position of the other vehicle 2, which is measured with respect to the first coordinate system (C1) after a pre-selected time (A T) passes, may be (dx+Vx,2*ΔT, dy+Vy,2*ΔT), and when the movement transformation is performed thereon, a position of the other vehicle 2 measured with respect to the second coordinate system (C2) may be (A, B)=(dx+Vx,2*ΔT−Δx, dy+Vy,2*ΔT−Δy), wherein Δx=Rs*sin(Vx,1*ΔT/Rs), Δy=Δx2/2Rs.

When the rotational transformation is performed on (dx+Vx,2*ΔT−Δx, dy+Vy,2*ΔT−Δy), a position of the other vehicle 2 with respect to the second coordinate system (C2) may be expressed by (X*cos(φ ΔT)+Y*sin(φ ΔT), −X*sin(φ ΔT)+Y*cos(φ ΔT)).

When the movement transformation and the rotational transformation are performed, a position with respect to the second coordinate system (C2) may be expressed by (dx', dy')=([dx+Vx,2*ΔT−Δx]*[cos(φ ΔT)]+[dy+Vy,2*ΔT−Δy]*[sin(φ ΔT)], dy'=−[dx+Vx,t*ΔT−Δx]*[sin(φ ΔT)]+[dy+Vy, t*ΔT−Δy]*[cos(φ ΔT)]) (refer to FIG. 4).

As mentioned above, a relative velocity vector value (Vrel=(Vx,sf, Vy,sf)) of the other vehicle 2 with respect to the vehicle 1 may be calculated by the transformed coordinate values and the following equation 1.

$$Vx, sf = \lim_{\Delta T \to 0} \frac{dx' - dx}{\Delta T} = Vx, 2 - Vx, 1 + dy * \Phi \quad \text{[Equation 1]}$$

$$Vy, sf = \lim_{\Delta T \to 0} \frac{dy' - dy}{\Delta T} = Vy, 2 - Vy, 1 - dx * \Phi$$

Vx, sf and Vy, sf represents a relative speed, to which sensor fusion is applied, in the longitudinal direction and the lateral direction of the other vehicle 2. Vx, 2 and Vy, 2 represents a relative speed in the longitudinal direction and the lateral direction of the other vehicle 2, with respect to the vehicle 1. Equation 1 may be summarized as Vx,2=Vx,sf+Vx,1−dy*φ and Vy,2=Vy,sf+Vy,1−dx*φ, and the DAS 100 may calculate the risk of collision by applying a variety of data, which is acquired by the radar and camera installed in the vehicle 1, to the above mentioned calculation method.

Figure 6:
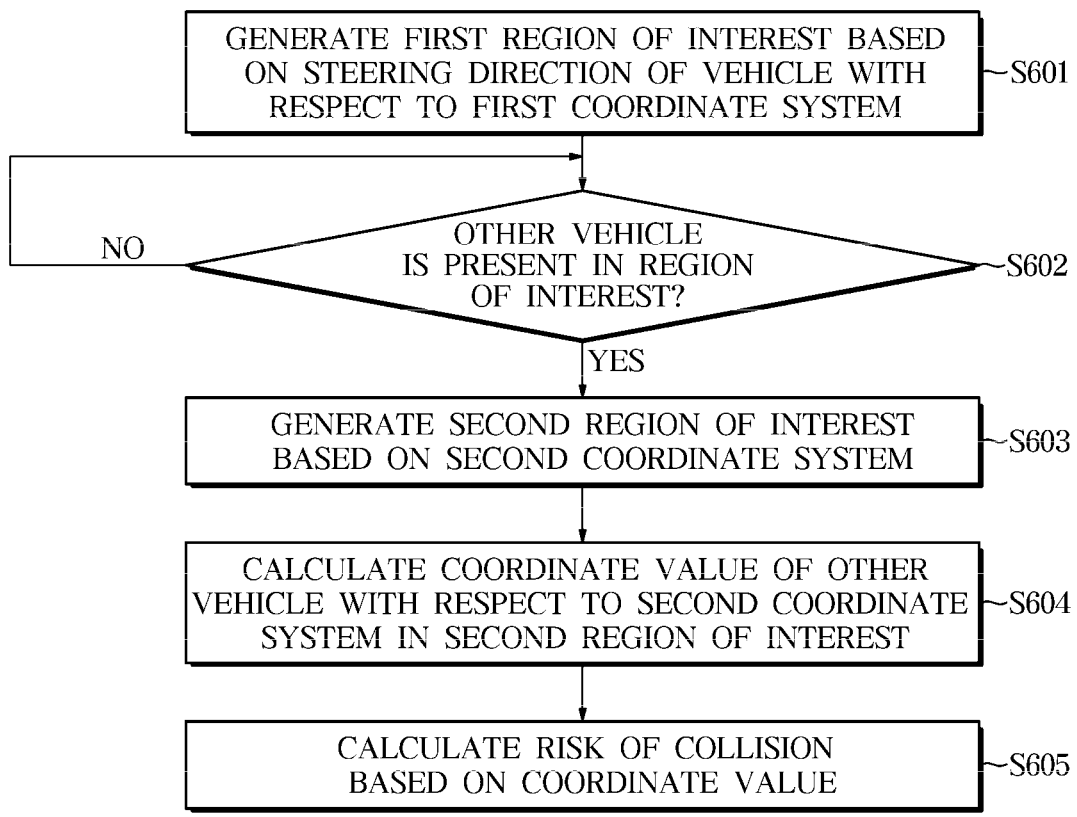
FIG. 6 is a flowchart illustrating a control method of a driver assistance system according to an embodiment.

Hereinafter a control method of a driver assistance system according to an embodiment will be described with reference to FIG. 6. However, the embodiment is merely an example, and thus it should be understood that a step is added or omitted as needed. In addition, for description of convenience, a subject of each step is omitted. Hereinafter a control method of vehicle according to an embodiment will be described.

In step 601, the first region of interest may be set based on the steering direction of the vehicle with respect to the first coordinate system. The steering direction of the vehicle may generate the expected driving path and the first region of interest may have a curved triangle, as described above.

In step 602, whether other vehicle is detected in the first region of interest may be identified and when it is identified that the other vehicle is present in the first region of interest, it may be identified that the risk of collision is high. After the vehicle moves along the expected driving path for a pre-selected period of time, the second region of interest may be generated with respect to the second coordinate system (603).

In step 604, a coordinate value of other vehicle may be calculated based on the second coordinate system in the second region of interest. The relative velocity vector value or the relative position vector value of other vehicle may be calculated using the calculated coordinate value.

The collision risk may be calculated based on the calculated coordinate values. For example, when the relative position vector value approaches 0 after TTC time in step 604, or when a rapid change in the relative speed vector value is detected, it may be identified that the collision risk is high.

As is apparent from the above description, according to the proposed driver assistance system and control method thereof, it may be possible to reduce the amount of computation of the control process and to estimate the risk of collision with high reliability, since the risk of collision with other vehicle is calculated based on the region of interest to which an expected driving path of the vehicle is applied.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored. For example, there may be a Read Only Memory (ROM), a Random Access Memory (RAM), a magnetic tape, a magnetic disk, a flash memory, and an optical data storage device.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A driver assistance system comprising:
   a radar installed in a vehicle to detect other vehicle driving outside of the vehicle, and configured to acquire radar data comprising position information of the other vehicle; and
   a controller configured to calculate a risk of collision based on a relative distance of the other vehicle with respect to the vehicle,
   wherein the controller generates a first region of interest partitioned along an expected driving path of the vehicle, generates a second region of interest during the vehicle moves along the expected driving path of the vehicle, when the other vehicle is detected in the first region of interest, and calculates a relative distance of the other vehicle detected in the second region of interest, and
   the first region of interest is generated with respect to a first coordinate system, and the second region of interest is generated with respect to a second coordinate system corresponding to after the vehicle moves along the expected driving path for a pre-selected period of time.

2. The driver assistance system of claim 1, wherein
the first region of interest is partitioned along the expected driving path according to a steering angle of the vehicle, and a shape of the first region of interest has a curved triangle.

3. The driver assistance system of claim 1, wherein
the second coordinate system corresponds to a coordinate system in which movement transformation and rotational transformation is performed on an origin of the first coordinate system.

4. The driver assistance system of claim 3, wherein
the second region of interest is partitioned along the expected driving path according to a steering angle of the vehicle, and a shape of the second region of interest has a curved triangle.

5. The driver assistance system of claim 4, wherein
the controller calculates a position vector of the other vehicle when the other vehicle is detected in the second region of interest and when a value of the position vector is reduced, the controller increases the risk of collision.

6. The driver assistance system of claim 1, further comprising:
a camera installed in the vehicle to have a field of view outward of the vehicle, and configured to acquire position information of the other vehicle.

7. A control method performed by a driver assistance system installed in a vehicle, the control method comprising:
acquiring radar data comprising position information of other vehicle; and
calculating a risk of collision based on a relative distance of the other vehicle with respect to the vehicle;
wherein the calculation of the risk of collision comprises generating a first region of interest partitioned along an expected driving path of the vehicle, generating a second region of interest after the vehicle moves along the expected driving path of the vehicle, when the other vehicle is detected in the first region of interest, and calculating a relative distance of the other vehicle detected in the second region of interest, and
the first region of interest is generated with respect to a first coordinate system, and the second region of interest is generated with respect to a second coordinate system corresponding to after the vehicle moves along the expected driving path for a pre-selected period of time.

8. The control method of claim 7, wherein
the first region of interest is partitioned along the expected driving path according to a steering angle of the vehicle, and a shape of the first region of interest has a curved triangle.

9. The control method of claim 7, wherein
the second coordinate system corresponds to a coordinate system in which movement transformation and rotational transformation is performed on the originan origin of the first coordinate system.

10. The control method of claim 9, wherein
the second region of interest is partitioned along the expected driving path according to a steering angle of the vehicle, and a shape of the second region of interest has a curved triangle.

11. The control method of claim 10, wherein
the calculation of the risk of collision comprises calculating a position vector of the other vehicle when the other vehicle is detected in the second region of interest and increasing a riskthe risk of collision when a value of the position vector is reduced.

12. The control method of claim 7, further comprising:
acquiring position information of the other vehicle based on image data acquired by a camera installed in the vehicle.

* * * * *